United States Patent [19]

Wells

[11] 4,215,598
[45] Aug. 5, 1980

[54] WIRE INSULATION STRIP LENGTH GAUGE

[75] Inventor: Royzell F. Wells, Littleton, Colo.

[73] Assignee: Ideal Industries, Inc., Sycamore, Ill.

[21] Appl. No.: 948,955

[22] Filed: Oct. 5, 1978

[51] Int. Cl.² .................. H02G 1/12; B26B 17/00
[52] U.S. Cl. ...................... 81/9.5 A; 30/179
[58] Field of Search .............. 30/90.1, 91.2, 179, 30/286; 81/9.5 R, 9.5 A, 9.5 C

[56] References Cited

U.S. PATENT DOCUMENTS

| 2,752,676 | 7/1956 | Trickle, Jr. | 30/91.2 |
|---|---|---|---|
| 2,889,728 | 6/1959 | Hindenburg | 81/9.5 A |
| 3,377,891 | 4/1968 | Horrocks | 81/9.5 C |
| 3,728,789 | 4/1973 | Fischer | 30/90.1 |

FOREIGN PATENT DOCUMENTS 301987  7/1900  France ........................ 30/179

*Primary Examiner*—James G. Smith
*Attorney, Agent, or Firm*—Kinzer, Plyer, Dorn & McEachran

[57] ABSTRACT

A device for setting the length of insulation to be stripped from an end of a wire, used in conjunction with wire strippers. The device comprises a stop which limits the extent to which the end of the wire can extend beyond the stripper blades. The position of the stop is infinitely adjustable to provide for varying strip lengths. A graduated measurement scale indicates the distance between the stripper blades and the face of the stop, thereby indicating the strip length. A threaded transporting member is used to move the stop back and forth.

7 Claims, 4 Drawing Figures

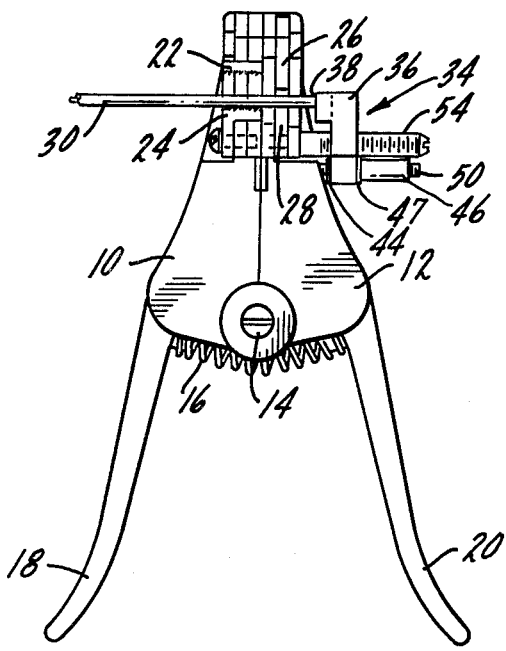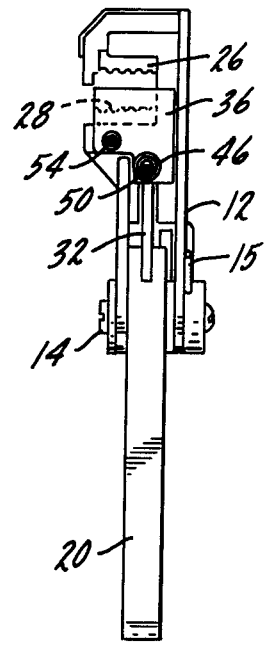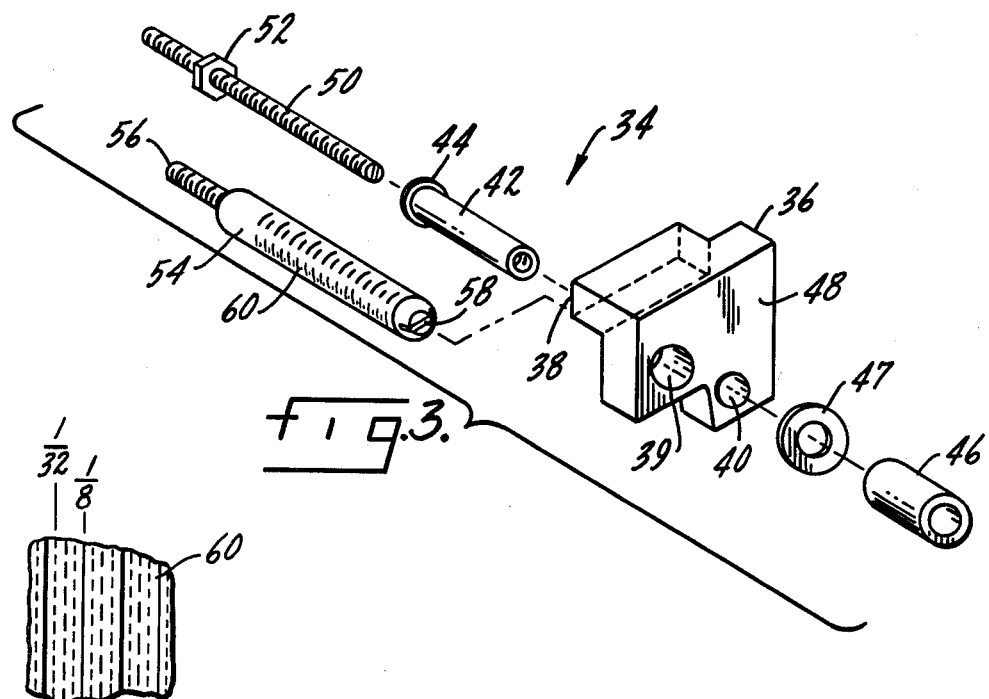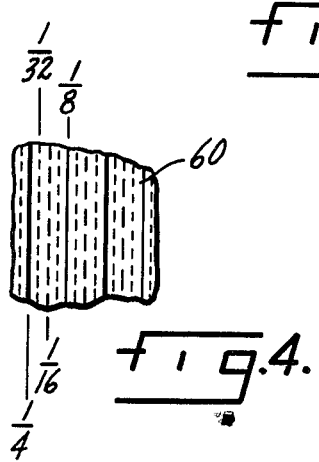

WIRE INSULATION STRIP LENGTH GAUGE

SUMMARY OF THE INVENTION

This invention relates to tools for stripping insulation from electrical wires. It is particularly suitable for use with plier-type strippers.

A primary object of the present invention is a precision, infinitely-adjustable wire stop for setting insulation strip lengths on wire strippers.

Another object is a wire stop which does not interfere with the visibility of the wire notches in the stripper blades.

Another object is a wire stop which does not require the use of a set screw to hold the stop in its set position.

Another object is a wire stop that does not require the use of a separate measurement scale to set the stop position.

Another object is a wire stop that can be set by one hand.

Another object is a wire stop which can be readily incorporated in existing wire stripper designs.

Accordingly, the invention is directed to a gauge for setting insulation strip lengths. the gauge includes a wire stop which limits the distance the end of the wire can extend beyond the stripper blades. The space between the blades and the face of the stop determines the length of the insulation slug. A threaded transporting member is provided to move the wire stop to any desired position. Thus, the wire stop position is continuously adjustable without the need for a set screw to hold it in place. A measurement scale with graduations marked on it indicates the distance between the stripper blades and the face of the wire stop. This scale is calibrated to be read at an easily visible side of the stop.

BRIEF DESCRIPTION OF THE DRAWINGS

FIG. 1 is a front view of a plier-type wire stripper with the strip length gauge of the present invention attached. The stripper is in the open, or at rest, position with a length of insulated wire inserted between the gripper jaws and between the blades, and abutted against the wire stop;

FIG. 2 is a side view of a wire stripper with the gauge attached;

FIG. 3 is an exploded view of the strip length gauge showing the various parts which would be attached to the stripper, and FIG. 4 is a flat pattern or roll out view of the measurement scale of the graduated stud of FIG. 3.

DESCRIPTION OF THE PREFERRED EMBODIMENT

This invention is in the nature of a novel device for setting insulation strip lengths on wire strippers. It is particularly useful in conjunction with the plier-type wire stripper shown and claimed in U.S. Pat. No. 2,889,728, although it is not restricted to that specific wire stripper. Reference is made to that patent for the details of the basic wire stripper structure.

Basically, the stripper includes a pair of levers 10 and 12 pivoted together at 14. A torsion spring 15 is positioned on the levers to bias them to the closed position shown in FIG. 1. A pair of handles 18 and 20 are also pivoted at 14 for manual manipulation. A coil spring 16 is positioned between the handles to bias them in the open position. One lever 10 carries a pair of clamping jaws 22 and 24 for holding the insulated wire. The other lever 12 carries stripping jaws or blades 26 and 28 to cut through the insulation and strip it off when the levers are biased apart. One gripping jaw 24 is fixed on its lever while the other 22 is movable by actuation of the handle members 18 and 20. The gripping jaws have specially constructed serrated faces so that the insulation of the wire 30 will be gripped without nicking or cutting. Similarly, stripping blade 26 moves up and down on lever 12 to cut the insulation from the end of the wire 30. Part of the link which moves the stripping blade 26 is shown in FIG. 2 at 32.

All of the above is basically the same as that shown in the above-mentioned U.S. patent and further details will not be set forth.

The strip length gauge of the present invention is shown generally at 34. As can be seen in FIG. 1, the gauge provides an abutment or stop 36 which limits the extent to which the wire 30 can extend beyond the stripper blades 26 and 28. The distance between the stripper blades and the front or abutment face 38 of the stop 36 is the length of insulation which will be removed upon closing of the handles 18 and 20.

The details of the strip length gauge are shown in FIG. 3. The stop 36 is made of molded plastic or other suitable material and has upper and lower holes 39 and 40 respectively. When assembled, the spool 42 fits through the lower hole 40 to support and transport the stop 36. The flared end 44 of the spool rests against the stop 36. The resilient grip 46 fits snugly over the exposed end of the spool, bearing against a washer 47 which in turn bears on the outside face 48 of the stop. Together, the spool 42, washer 47 and resilient grip 46 form the transporter or positioning member of the gauge.

The lower hole 40 may have a clearance diameter over the spool 42 diameter, in order to provide allowance for the tolerances on the locations of the tapped holes in the stripper, frame and the two holes in the stop. Also for this reason, a washer may be included between the stop 36 and the flared end 44 of the spool. The threaded stock 50 is threaded into an existing tapped hole in the stripper and it is retained there by lock nut 52. The spool 42 is internally threaded to engage the threads of stock 50. Since the stop 36 is trapped between the spool flange 44 and the washer 47, grip 46, rotating the grip will cause the stop to move back and forth with the spool on stock 50. This provides continuous adjustability along the length of the stock. Furthermore, this adjustment can be made by the user with only one hand. The adjustment does not require loosening a set screw, adjusting the stop position by use of a separate measurement tool, and then holding that position while the set screw is retightened. Instead, just a simple rotation of the grip 46 is all that is needed.

Besides positioning the stop 36 on the spool 42, the resilient sleeve or grip 46 serves as the antirotational feature for the transporter to prevent inadvertant changes of the stop position by the user, and to prevent vibrational rotation of the spool during operation, especially on power actuated strippers. The resilient sleeve is slidably adjustable on the spool in that the greater the axial force applied to the sleeve, the greater the residual force between the sleeve, the washer, and the stop, and, between the flared end 44 of the spool and the stop. The residual force causes friction between those members which prevents unwanted rotation of the spool.

A graduated stud 54 fits through the upper hole 39 of the stop 36. Sufficient clearance between the diameter of the hole and the outside diameter of the stud is provided to allow the stop to slide freely over the stud. The stud 54 has a threaded reduced diameter at end 56 for mounting it to the stripper. A slot 58 at the opposite end facilitates attachment of the stud to the stripper. The scale 60 on the stud is calibrated such that the scale can be read at outside face 48 of the stop 36. Thus, the reading on the scale at the face 48 tells the user the distance between the stripper blades 26 and 28 and the front face 38 of the stop. This is the length of insulation that will be removed.

The graduation marks of the scale 60 are continuous around the circumference of the stud 54 so that the scale may be read from any angle around the axis of the stud; and, so that it is not necessary to rotationally index the scale with the threads at end 56 and, with the internal threads and thicknesses of the stripper itself. As seen in FIG. 4, the graduations are repetitively coded so that a particular code (a heavy continuous line, a light continuous line, dashes or dots, etc.) always designates the same increment of length such as 1/32, 1/16, ⅛ or ¼ of an inch. The illustration uses fractions of an inch but any system of length measurement may be used.

To use the device, the plastic stop is moved to the desired setting by turning the resilient grip 46. Clockwise rotation will move the stop closer to the stripper blade while counterclockwise rotation moves it away from the blade. The position of the stop, and therefore, the insulation strip length, is read directly from the scale 60. The insulated wire is located in its proper wire gauge notch in the lower stripper jaw 28. The wire is then pushed lengthwise against the stop face 38 and the stripper handles are actuated to cut and remove the insulation.

While the basic device has been shown and described, it will be realized that many changes may be made in size, shape and disposition of the parts. As an additional feature, a magnifying lens could be molded into the plastic stop to enlarge the graduation of the scale. Any unit of measure, such as fractions, decimal, metric, etc., may be used for the scale. Also, the wire size or gauge numbers could be marked in the top surface of the stop 36 to correspond to the wire gauge notches in the stripper blades.

While the repetition of the measurement codes on the scale is coarse enough, say every ¼ inch, to be quickly recognizable in total length, a separate gauge may be used to set the strip length. Such a gauge would have separate increments of lengths numerically identified, and the desired strip length would be set by adjusting the exposed length of the graduated stud to match the desired length identified on the gauge.

I claim:

1. In a wire insulation stripper of the type having a pair of stripper blades for cutting insulation material, a gauge for setting insulation strip lengths comprising:
    a threaded stock attached to the stripper perpendicular to the plane of the stripper blades;
    a wire stop having an abutment face located where it limits the distance the end of a wire can extend beyond the stripper blades; and
    a rotatable transporter engaging the wire stop and having threads which engage those of the stock such that upon rotation the transporter is movable along the stock to vary the separation between the wire stop's abutment face and the stripper blades so that the insulation strip length is continuously adjustable.

2. The structure of claim 1 further comprising of a measurement scale attached to the stripper for indicating the distance between the stripper blades and the abutment face of the wire stop, thus indicating the insulation strip length.

3. The structure of claim 2 wherein the wire stop includes a hole through which the measurement scale extends.

4. The structure of claim 3 wherein the measurement scale is a graduated stud attached to the stripper perpendicular to the plane of the stripper blades and parallel to the threaded stock.

5. The structure of claim 2 wherein the measurement scale graduations are continuous around the periphery of the scale to be easily read at any rotational angle around the scale axis.

6. The structure of claim 2 wherein the graduation of the scale are repetitively coded so that units of measurement may be easily recognized without numerical identification.

7. The structure of claim 1 wherein the wire stop includes a hole for receiving the transporter and the transporter comprises:
    an internally-threaded spool mounted on the stock and extending through the hole in the stop, the spool having one enlarged, flared end which retains the wire stop on the spool; and
    a resilient sleeve which fits snugly over the opposite end of the spool to engage the wire stop between the flared end and the sleeve so that rotation of the spool causes the transporter and wire stop to move together along the stock.

* * * * *

UNITED STATES PATENT OFFICE
CERTIFICATE OF CORRECTION

PATENT NO. : 4,215,598
DATED : August 5, 1980
INVENTOR(S) : Royzell F. Wells

It is certified that error appears in the above-identified patent and that said Letters Patent are hereby corrected as shown below:

In the Heading, the line designated [73], delete "Assignee: Ideal Industries, Inc., Sycamore, Ill.".

Signed and Sealed this

Twenty-first Day of September 1982

[SEAL]

Attest:

GERALD J. MOSSINGHOFF

Attesting Officer     Commissioner of Patents and Trademarks